May 29, 1956
D. J. REED
2,747,649
METHOD AND APPARATUS FOR FABRICATING A
TUBULAR ARTICLE FROM A FIBROUS STRAND
Filed Dec. 2, 1954
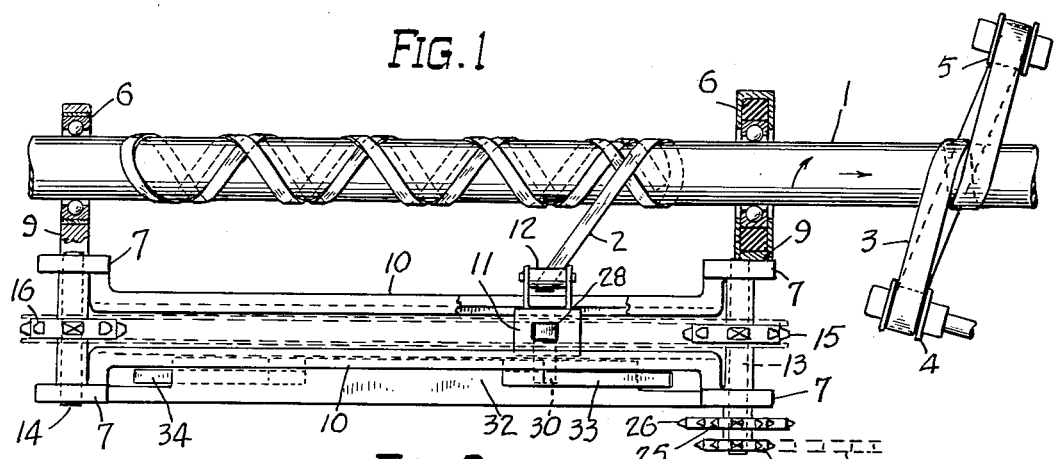
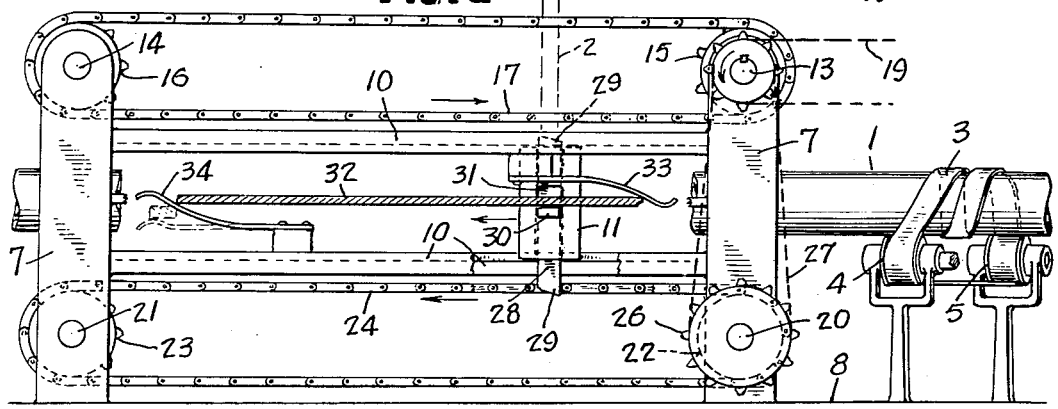
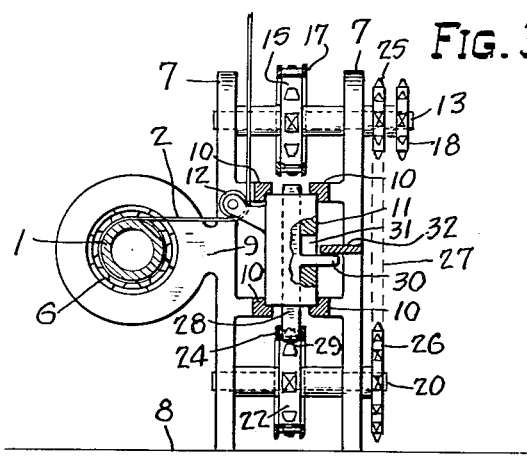
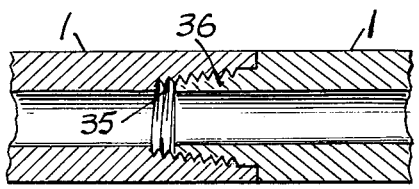
INVENTOR.
Daniel J. Reed
BY Andrus & Scales
ATTORNEYS.

United States Patent Office 2,747,649
Patented May 29, 1956

2,747,649

METHOD AND APPARATUS FOR FABRICATING A TUBULAR ARTICLE FROM A FIBROUS STRAND

Daniel J. Reed, Milwaukee, Wis., assignor to A. O. Smith Corporation, Milwaukee, Wis., a corporation of New York Application December 2, 1954, Serial No. 472,636

8 Claims. (Cl. 154—1.7)

This invention relates to an apparatus for continuously winding long strands of fibrous material in a helical pattern to form a tubular article.

Tubular articles such as pipe sections are frequently fabricated by winding long reinforcing fibers, such as glass fibers, in a generally helical pattern about a cylindrical mandrel. The fibers are generally impregnated with a liquid uncured thermosetting resin, and on curing of the resin the fibers are bonded together to form an integral resin-bonded structure.

When fabricating a pipe section from long reinforcing fibers, it is desirable, in order to provide the pipe with the required strength for service, to construct the pipe with a plurality of superimposed layers of helical windings with each alternate layer having a reverse pitch. Generally, the helical windings are wound with a helix angle of about 35.4° for it has been determined that windings of this angle are most capable of withstanding both the circumferential and longitudinal stresses to which the pipe is subjected in service.

To wind the fibers continuously on the mandrel to form a pipe of indefinite length, the mandrel or the winding head must move longitudinally with respect to the other. For practical operations the mandrel is generally moved longitudinally, and with the longitudinal movement of the mandrel, it has not been possible on a production scale to wind the fibers with a double helical pattern, i. e. with each alternate layer having a reverse pitch, and yet maintain a constant helix angle throughout the layers.

The prseent invention is directed to an apparatus for winding a continuous length of pipe by winding a fibrous strand in a double helical pattern with a constant helix angle.

According to the invention the mandrel is rotated and simultaneously moved in a longitudinal direction. The fibrous roving is carried by a winding head which reciprocates longitudinally of the mandrel within fixed limits and winds the roving on the mandrel in a helical pattern. To maintain a constant helix angle when the winding head is traveling both in a forward and a reverse direction, the speed of the winding head is varied so that the winding head will move with a lesser speed when traveling in a direction opposite to the direction of longitudinal movement of the mandrel and will move with a greater speed when traveling in a direction corresponding to the longitudinal movement of the mandrel.

With this construction, a tubular member having a plurality of layers of windings with a uniform helix angle can be formed in a continuous operation.

The accompanying drawing illustrates the best mode presently contemplated of carrying out the invention as described hereinafter.

In the drawings:

Figure 1 is a top plan view of the apparatus of the invention partly in section;

Fig. 2 is a side elevation of the apparatus of Figure 1 parts being broken away and sectioned;

Fig. 3 is a transverse sectional view of the apparatus of Figure 1; and

Fig. 4 is a fragmentary enlarged sectional view showing the end-to-end attachment of two mandrel sections.

The drawing illustrates an apparatus for the fabrication of a tubular member by winding a fibrous strand in a plurality of superimposed layers in a continuous operation.

The apparatus comprises a generally cylindrical mandrel 1 on which the fibrous strand of reinforcing material 2 is wound to form a tubular article such as a pipe section or the like.

The strand 2 is formed of a plurality of long fibers or filaments of glass, mineral or synthetic material which are suitably impregnated with a binding material such as an uncured liquid thermosetting resin. On curing of the resin, an integral fiber-reinforced article is produced.

To form a continuous length of pipe, the mandrel is rotated and moved longitudinally by a drive mechanism comprising a belt 3 which passes over a driven pulley 4 and an idler pulley 5. The belt 3 is wound around the mandrel 1 with a single convolution and on rotation of the driven pulley through operation of a motor, not shown, the belt 3 serves to drive the mandrel longitudinally, in the direction of the arrow in Figure 1, as well as rotate the mandrel. The mandrel is supported in a conventional manner by a plurality of bearings 6 which will permit the mandrel to travel longitudinally as well as rotate.

The fibrous strand 2 is carried by a winding head assembly which reciprocates between fixed limits and serves to lay the strand 2 on the mandrel 1 in a generally helical pattern.

The winding head assembly comprises spaced vertical supports 7 which are secured in upstanding relation to a base 8. Each of the bearings 6 is connected to a support 7 by means of a bracket 9 which extends outwardly from the support 7 and carries the bearing. A plurality of horizontal, channel-shaped guide rails 10 are secured to the mid-portions of the supports 7 and receive the longitudinal edges of the rectangular winding head 11. The rails 10 serve to guide head 11 in horizontal reciprocating movement in a path generally parallel to the longitudinal axis of mandrel 1.

The fibrous strand 2 is contained on a suitable reel, not shown, and passes under a guide roller 12 which is rotatably connected to head 11. The strand 2 is drawn onto the mandrel 1 in a generally helical pattern by the rotation and longitudinal travel of the mandrel.

To wind the strand 2 on the mandrel in a plurality of superimposed layers having a constant helix angle, the winding head 11 is moved reciprocally on rails 10 by a pair of drive mechanisms having different speeds of travel. When the head 11 is traveling in a direction corresponding to the direction of longitudinal movement of mandrel 1, the strand 2 will be wound on the mandrel with a given helix angle. However, if the head 11 returns in the direction opposite to the direction of longitudinal mandrel movement at the same rate of speed, the helix angle will be substantially greater due to the opposite relative movement between the mandrel and the head. As it is desired to maintain a constant helix angle, usually about 35.4°, in all of the superimposed layers in order to most effectively resist the circumferential and longitudinal stresses to which the pipe is subjected in service, the speed of the head is increased as the head moves in the direction corresponding to the mandrel movement and decreased as the head moves in the direction opposite to the mandrel movement so as to provide a constant helix angle in all layers.

To provide head 11 with a variable speed of travel, a pair of shafts 13 and 14 are rotatably secured to the upper ends of the opposite pairs of the supports 7. A drive sprocket 15 is secured to shaft 13 and an idler sprocket 16 is carried by shaft 14. The pulleys are connected by an endless chain 17. The shaft 13 is driven by a sprocket 18 which is keyed thereto and is connected by chain 19 to a motor or other driving mechanism. Operation of the motor acting through the chain drive rotates shaft 13 which in turn rotates drive sprocket 15 and moves the chain 17 around the sprockets.

A second chain drive of different speed and opposite direction of movement from the first chain drive is provided by rotatably securing a second pair of shafts 20 and 21 to the lower end portions of the opposite pairs of supports 7. The shafts 20 and 21 carry a drive sprocket 22 and an idler sprocket 23, respectively, and an endless chain 24 connects the sprockets 22 and 23. The shaft 20 is driven by a chain take-off from shaft 13 in which sprockets 25 and 26 are secured to shafts 13 and 20, respectively, and a chain 27 connects the sprockets 25 and 26. The diameter of sprocket 26 is larger than the diameter of sprocket 25 so that shaft 20 is driven at a lower rate of speed than shaft 13 and chain 24 will travel at a lower rate of speed than chain 17.

The head 11 is alternately connected to chain 17 and chain 24 by a load and fire mechanism which includes a pin 28 which is slidably disposed within a vertical passage in head 11. The upper and lower ends of pin 28 are provided with chisel-shaped tips, indicated by 29, which are adapted to engage alternately with the chains 17 and 24, respectively.

To position pin 28 within the passage in head 11, the pin is provided with a generally rectangular ear 30 which extends outwardly from the right side of the pin through a slot 31 formed in the head, as best shown in Fig. 3.

With the upper end 29 of pin 28 engaged with the lower lead of chain 17 which is traveling to the right in Fig. 2, the head 11 will move in a direction corresponding to the longitudinal movement of the mandrel. During this movement of the head 11, the ear 30 rides on a horizontal bar 32 which serves to maintain the ear in the upper end of slot 31 and thus maintain the engagement of pin 28 with chain 17. The bar 32 is supported on the supports 7.

As the head approaches the limit of its travel, defined by the end of bar 32, the pin is automatically disengaged from chain 17 and engaged with chain 24 to move the head in a reverse direction. The construction to accomplish the shifting of pin 28 comprises a leaf spring 33 which is fixed at its inner end to an upper rail 10 and has its free end bearing against the end of bar 32 and the ear 30 wedged between the spring 33 and bar 32, against the force of the spring, as the head 11 approaches the end of its forward travel. When ear 30 reaches the end of bar 32, the spring 33 forces the ear downwardly, thereby moving pin 28 downwardly in the passage in head 11 to disengage the pin from chain 17 and engaging the lower end of the pin with the upper lead of chain 24 which lead is traveling in a direction opposite to the direction of movement of the lower lead of chain 17. With the pin 23 disengaged from chain 17 and in engagement with the upper lead of chain 24, as shown in Fig. 2, the head is moved in a reverse direction, opposite to that of the longitudinal movement of the mandrel, to wind the strand 2 on the mandrel with a reverse pitch. As the speed of travel of chain 24 is less than chain 17, the helix angle will remain substantially constant even though the head 11 and mandrel 1 are moving in opposite directions relative to each other.

When the pin 28 is engaged with chain 24, the pin is prevented from falling from the passage in the head by the engagement of ear 30 with the lower end of slot 31.

A spring 34, similar in construction and function to spring 33, is disposed beneath bar 32 at the opposite end of the path of travel of head 11. Spring 34 serves to engage ear 30 and force pin 28 upwardly out of engagement with chain 24 and into engagement with chain 17. The head 11 will then move in the original direction of travel to wind a third layer of strands on the mandrel.

In operation of the apparatus the strand is initially fastened to the mandrel and the belt 3 is driven to impart both longitudinal and rotary motion to the mandrel. The motion of the mandrel draws the strand from the reel and winds the same on the mandrel.

In conjunction with the movement of the mandrel, the winding head 11 is also moved reciprocally by the alternate engagement of its pin 28 with the drive chains 17 and 24. The speed of travel of the head 11 is considerably greater in both the forward and reverse directions than the speed of advancement of the mandrel so that the windings starting at a given point on the mandrel can progress in a given direction and return to a position adjacent the starting point. In this manner a plurality of superimposed layers of strands are assured with each layer being progressively offset longitudinally with respect to adjacent layers. As previously pointed out, the speed of the winding head 11 is greatest in a direction corresponding to the direction of longitudinal movement so that the helix angle of the strands in all layers is constant. By changing the speed of travel of the winding head, a predetermined speed differential is maintained between the winding head and a given point on the mandrel as the head and mandrel alternately travel in corresponding and opposite directions.

In order to fabricate a continuous length of tubing a series of mandrels can be connected in an end-to-end relation so as to follow each other through the winding apparatus. By following one mandrel after the other, the winding apparatus can run continuously and the wound tubing can be cut into sections at the mandrel joints after passage through the winding apparatus.

Fig. 4 illustrates a method of connecting two mandrels in an end-to-end relation. The trailing end of each mandrel is provided with a tapered threaded recess 35 which is adapted to threadedly receive the tapered nose 36 on the leading end of the following mandrel. The hand of the threads are selected so that the threaded joint between mandrels which is approaching the winding apparatus and the belt drive 3 will be tightened by the rotation of the driven mandrel. After severing the tubing on the outgoing side of the apparatus, the leading mandrel can be retarded in rotation which will release the threaded engagement between it and the presently driven mandrel.

Various modes of carrying out the invention are contemplated as being within the scope of the following claims particularly pointing out and distinctly claiming the subject matter which is regarded as the invention.

I claim:

1. An apparatus for winding a fibrous strand to form a tubular article which comprises a generally cylindrical mandrel, means to rotate the mandrel, means for moving said mandrel longitudinally as said mandrel is rotated, a winding head to carry the fibrous strand and wind said strand on the mandrel, drive means for reciprocating said winding head between fixed limits in a path generally parallel to the longitudinal axis of the mandrel to wind the strand on the mandrel in a double helical pattern, and means for automatically varying the speed of said drive means to effect a greater speed of movement of the winding head in a direction corresponding to the direction of longitudinal movement of the mandrel and to effect a lesser speed of movement of the winding head in a direction opposite to the direction of longitudinal movement of the mandrel to produce a double helical pattern of substantially constant helix angle.

2. An apparatus for winding a fibrous strand to form a tubular article which comprises a generally cylindrical mandrel, means to rotate the mandrel while simultaneously advancing said mandrel longitudinally, a winding head to carry the fibrous strand and wind said strand on the mandrel, a track disposed generally parallel to the longitudinal axis of the mandrel to support the winding head, drive means adapted to engage the winding head and move the same in a direction corresponding to the direction of longitudinal advancement of the mandrel on said track at a given speed to wind the strand on the mandrel in a helical pattern with a predetermined helix angle, second drive means adapted to engage the winding head and move the same in the opposite direction on said track at a substantially lesser speed than said first named speed to wind the strand on the mandrel in a reverse helical pattern with a helix angle corresponding to said first named helix angle, and means associated with the track to alternately engage said winding head with said first drive means and said second drive means.

3. An apparatus for winding a fibrous strand to form a tubular article which comprises a generally cylindrical mandrel, means to rotate the mandrel while simultaneously moving said mandrel longitudinally, a track disposed generally parallel to the longitudinal axis of the mandrel and having a substantially lesser length than said mandrel, a winding head supported on the track and adapted to ride thereon, a strand of long fiber reinforcing material carried by said winding head, drive means operating in the direction of longitudinal movement of the mandrel at a given speed, means to engage the winding head with said drive means to move the winding head on the track in the direction of longitudinal movement of the mandrel toward an end of said track to wind the strand on said mandrel in a generally helical pattern and form a layer of the tubular article, second drive means operating in the direction opposite to that of said first drive means, means for providing said second drive means with a substantially lesser speed than said first drive means, means to disengage said winding head from said first drive means when said head approaches the end of said track and to engage said head with said second drive means to move the head on the track in a direction opposite to the direction of longitudinal movement of the mandrel toward the other end of the track and to wind said strand on the mandrel in a reverse helical pattern with respect to said first-named pattern to produce a double helical pattern of substantially uniform helix angle.

4. An apparatus for winding a fibrous strand to form a tubular article which comprises a generally cylindrical mandrel, means to rotate the mandrel while simultaneously moving said mandrel longitudinally, a winding head to carry the fibrous strand and wind said strand on the mandrel, drive means for reciprocating said winding head between fixed limits in a path generally parallel to the longitudinal axis of the mandrel to wind the strand on the mandrel in a double helical pattern, and means for automatically maintaining a substantially uniform speed differential between the speed of longitudinal movement of a given point on said mandrel and the speed of travel of the winding head as the mandrel and winding head move alternately in corresponding and opposite directions with relation to each other to produce a plurality of superimposed layers of windings with each alternate layer having a reversed pitch and all of said layers having a substantially uniform helix angle.

5. A method of fabricating a tubular article from a long filament of reinforcing material, which comprises attaching the long filament to a generally cylindrical mandrel, rotating the mandrel about the longitudinal axis thereof, advancing the mandrel longitudinally as the mandrel is rotated, reciprocating the filament between fixed limits in a path generally parallel to the longitudinal axis of the mandrel to wind the filament on the rotating mandrel in a plurality of superimposed layers of windings, and varying the speed of the reciprocation of the filament to effect a greater speed of movement of the filament in a direction corresponding to the direction of longitudinal movement of the mandrel and to effect a lesser speed of movement of the filament in a direction opposite to the direction of longitudinal movement of the mandrel to provide the windings of each of said layers with a substantially uniform helix angle.

6. A method of fabricating a tubular article from a long filament of reinforcing material, which comprises applying the long filament to a generally cylindrical mandrel, rotating the mandrel about the longitudinal axis thereof while simultaneously advancing the mandrel longitudinally, reciprocating the filament between fixed limits in a path generally parallel to the longitudinal axis of the mandrel to wind the filament on the rotating mandrel in a plurality of superimposed layers of windings, and maintaining a substantially uniform speed differential between the speed of longitudinal movement of a given point on said mandrel and the speed of reciprocation of the filament as the mandrel and the filament move alternately in corresponding and opposite directions with relation to each other to produce said superimposed layers of windings with each alternate layer having a reversed pitch and all of said layers having a substantially uniform helix angle.

7. An apparatus for winding a fibrous strand to form a tubular article which comprises a generally cylindrical mandrel, means to rotate the mandrel while simultaneously advancing said mandrel longitudinally, a winding head to carry the fibrous strand and wind said strand on the mandrel, a track disposed generally parallel to the longitudinal axis of the mandrel to support the winding head, drive means moving in a direction corresponding to the direction of longitudinal advancement of the mandrel and at a given speed of substantially greater magnitude than the speed of longitudinal advancement of the mandrel, second drive means moving in a direction opposite to the direction of longitudinal advancement of the mandrel and at a speed intermediate the speed of said first drive means and the speed of longitudinal advancement of the mandrel, a connecting member associated with the winding head and adapted to be alternately engaged with said first drive means and second drive means to move said winding head in a reciprocal path on said track and wind the strand on the mandrel in a plurality of superimposed layers with each alternate layer having a reverse pitch and all of said layers having a substantially uniform helix angle, and means disposed at each end of the track in position to be engaged by the winding head to disengage the connecting member from one of said drive means and engage said member with the other of said drive means and thereby automatically change the direction of travel and the speed of travel of the head.

8. A method of fabricating a tubular article from a long filament of reinforcing material, which comprises attaching the long filament to a generally cylindrical mandrel, rotating the mandrel about the longitudinal axis thereof while simultaneously advancing the mandrel longitudinally, reciprocating the filament between fixed limits in a path generally parallel to the longitudinal axis of the mandrel to wind the filament on the rotating mandrel in a plurality of superimposed layers of windings to form a tubular article, varying the speed of the reciprocation of the filament to effect a greater speed of movement of the filament in a direction corresponding to the direction of longitudinal movement of the mandrel and to effect a lesser speed of movement of the filament in a direction opposite to the direction of longitudinal movement of the mandrel to provide the windings of each of said layers with a substantially uniform helix angle, connecting a second mandrel in an end-to-end relation with the first named mandrel while said first mandrel is rotating and advancing and effecting a corresponding rotation and advancement of said second mandrel to wind said filament on said second mandrel to form a continuous length of said tubular article, severing the tubular article at a position adjacent the connection between said first and second mandrel, and separating said mandrels at the connection therebetween while the second mandrel is being wound with said filament to provide a continuous process for the fabrication of said tubular article.

References Cited in the file of this patent

UNITED STATES PATENTS

| | | |
|---|---|---|
| 1,268,048 | Norman | May 28, 1918 |
| 1,670,061 | Carroll | May 15, 1928 |
| 2,259,291 | Chapman | Oct. 14, 1941 |
| 2,630,157 | Smellie | Mar. 3, 1953 |